(12) United States Patent
Aggarwal et al.

(10) Patent No.: US 11,235,997 B2
(45) Date of Patent: Feb. 1, 2022

(54) ANAEROBIC WASTE TREATMENT SYSTEM FOR VEHICLES

(71) Applicant: The Boeing Company, Chicago, IL (US)

(72) Inventors: Saurabh Aggarwal, Bengaluru (IN); Rajeev Shastri, Karnataka (IN); Subramaniam Natarajan, Bengaluru (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/395,176

(22) Filed: Apr. 25, 2019

(65) Prior Publication Data

US 2020/0339458 A1 Oct. 29, 2020

(51) Int. Cl.
| | |
|---|---|
| *C02F 3/28* | (2006.01) |
| *C02F 1/00* | (2006.01) |
| *C02F 1/44* | (2006.01) |
| *C02F 1/32* | (2006.01) |
| *B64F 5/40* | (2017.01) |
| *B64D 11/02* | (2006.01) |
| *C02F 103/00* | (2006.01) |

(52) U.S. Cl.
CPC ............... *C02F 3/2853* (2013.01); *B64F 5/40* (2017.01); *C02F 1/001* (2013.01); *C02F 1/325* (2013.01); *C02F 1/441* (2013.01); *C02F 3/2806* (2013.01); *B64D 11/02* (2013.01); *C02F 2103/005* (2013.01); *C02F 2201/001* (2013.01)

(58) Field of Classification Search
CPC .......... C02F 1/325; C02F 1/441; C02F 1/001; C02F 2103/005; C02F 2201/001; C02F 3/2853; C02F 3/2806; B64F 5/40; B64D 11/02

USPC .......... 210/603, 601, 500.21, 484, 495, 615
See application file for complete search history.

(56) References Cited

U.S. PATENT DOCUMENTS

| | | | |
|---|---|---|---|
| 3,701,426 A | * | 10/1972 | Wetzel |
| 4,038,184 A | * | 7/1977 | Svanteson ............. C02F 11/121 405/129.28 |
| 5,843,305 A | * | 12/1998 | Kim |
| 6,254,775 B1 | * | 7/2001 | McElvaney |
| 6,670,173 B1 | * | 12/2003 | Schels .................... C12M 21/18 435/287.2 |

(Continued)

FOREIGN PATENT DOCUMENTS

KR 101 839 297 * 3/2018

OTHER PUBLICATIONS

Verma, "Anaerobic Digestion of Biodegradable Organics in Municipal Solid Wastes," Thesis, submitted in partial fulfillment of the requirements for Master of Science Degree in Earth Resources Engineering, Fu Foundation School of Engineering and Applied Science Columbia University, May 2002, 56 pages.

(Continued)

*Primary Examiner* — Nam X Nguyen
*Assistant Examiner* — Julia L. Wun
(74) *Attorney, Agent, or Firm* — Yee & Associates, P.C.

(57) ABSTRACT

A method, an apparatus, and a system for treating a waste in a vehicle. The waste is received from a lavatory in a waste tank through a waste input port connected to the lavatory in the vehicle. Anaerobic bacteria are introduced into the waste such that anaerobic digestion occurs to breakdown a biodegradable material in the waste in the waste tank.

42 Claims, 8 Drawing Sheets

(56) References Cited

U.S. PATENT DOCUMENTS

| | | | |
|---|---|---|---|
| 8,444,855 B2* | 5/2013 | Gavrieli | |
| 2008/0138883 A1* | 6/2008 | Young | |
| 2010/0193430 A1* | 8/2010 | Whiteman | |
| 2017/0022079 A1* | 1/2017 | Hildebrand | C02F 3/2806 |
| 2018/0162743 A1* | 6/2018 | Mackrodt | |
| 2019/0016620 A1* | 1/2019 | Saslaw | |

OTHER PUBLICATIONS

"State-of-the-Art Membrane Filtration of Water," WaterProfessionals, Membrane Filtration, Membrane Filtration Systems, copyright 2019, accessed Jan. 7, 2019, 3 pages. http://www.waterprofessionals.com/learning-center/articles/state-of-the-art-membrane-filtration/.

Trivedi, "How do the bio toilets in the Indian Railways (or others) work?," Quora, accessed Jan. 7, 2019, 4 pages. https://www.quora.com/How-do-the-bio-toilets-in-the-Indian-Railways-or-others-work.

"Drinking Water Treatment—Potassium Permanganate," eXtension, Drinking Water and Human Health, Dec. 6, 2010, 6 pages. https://articles.extension.org/pages/31569/drinking-water-treatment-potassium-permanganate.

"Compendium on IR-DRDO Bio-Toilets for Indian Railways," Indian Railways Centre for Advanced Maintenance Technology, 205 pages. http://www.wr.indianrailways.gov.in/cris/uploads/files/1466149457852-Compendium%20on%20IR-DRDO%20Bio-Toilets%20for%20Indian%20Railways.pdf.

\* cited by examiner

ANAEROBIC WASTE TREATMENT SYSTEM FOR VEHICLES

BACKGROUND INFORMATION

1. Field

The present disclosure relates generally to vehicles and, in particular, to a method, an apparatus, and a system for treating waste in a vehicle using anaerobic bacteria.

2. Background

Many factors affect efficient operation of vehicles, such as aircraft. For example, weight is a factor that can affect the fuel economy for an aircraft. The fuel economy is how an airline measures how much fuel an aircraft or a fleet of aircraft needs to provide a service such as moving passengers, cargo, or a combination thereof between different locations. As the weight of the aircraft increases, the fuel economy decreases.

Another factor that impacts the efficiency in operating vehicles, for example an aircraft, is the amount of time that an aircraft is out-of-service. Aircraft are pulled out-of-service for routine maintenance. The routine maintenance can include inspections, modification, reconfiguration, refurbishment, or other types of service. For example, the waste tanks holding waste from lavatories in the aircraft are periodically emptied and at other times cleaned and sanitized. When the aircraft is on the ground, lavatory trucks operate to empty the contents of the waste tanks and clean the waste tanks with a disinfectant. Performing this service can increase the amount of time that an aircraft is on the ground and unavailable for flight.

Therefore, it would be desirable to have a method and apparatus that take into account at least some of the issues discussed above, as well as other possible issues. For example, it would be desirable to have a method and apparatus that overcome a technical problem with at least one of fuel efficiency of an aircraft or an availability of the aircraft.

SUMMARY

An aspect of the present disclosure provides a vehicle waste treatment system in a vehicle. The waste treatment system comprises a waste tank, an anaerobic bacteria treatment system, a semipermeable membrane, and an output port in a separated portion of the waste tank. The waste tank in the vehicle is connected to a lavatory in the vehicle by a lavatory conduit, wherein the waste tank has a waste portion and a separated portion. The anaerobic bacteria treatment system contains anaerobic bacteria selected to digest a waste in the waste tank. The anaerobic bacteria system introduces the anaerobic bacteria to the waste such that anaerobic digestion occurs to breakdown biodegradable material in the waste in the waste tank. The semipermeable membrane divides the waste tank into a waste portion and separated portion. Water diffuses through the semipermeable membrane into the separated portion to form separated water. Separated water is removed from the separated portion through the output port in the separated portion of the waste tank.

Another aspect of the present disclosure provides a vehicle waste treatment system that comprises an anaerobic bacteria treatment system that is operable in a vehicle. The anaerobic bacteria treatment system that contains anaerobic bacteria selected to digest a waste in a waste tank in the vehicle from a lavatory in the vehicle. The anaerobic bacteria system introduces the anaerobic bacteria to the waste such that anaerobic digestion occurs to breakdown a biodegradable material in the waste in the waste tank.

Yet another aspect of the present disclosure provides a method for treating a waste in a vehicle. The waste is received from a lavatory in a waste tank through a waste input port connected to the lavatory in the vehicle. Anaerobic bacteria are introduced into the waste such that anaerobic digestion occurs to breakdown a biodegradable material in the waste in the waste tank.

Still another aspect of the present disclosure provides a method for servicing an anaerobic bacteria treatment system. Anaerobic bacteria are renewed in an anaerobic bacteria treatment system that contains anaerobic bacteria selected to digest waste in the waste tank wherein the anaerobic bacteria system introduces the anaerobic bacteria to the waste such that anaerobic digestion occurs to breakdown biodegradable material in the waste in the waste tank.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that weight from waste in waste tanks can reduce fuel efficiency of vehicles such as aircraft. The illustrative examples recognize and take into account that it would be desirable to reduce the weight of an aircraft by jettisoning water from the waste tanks. The illustrative examples recognize and take into account that it would be desirable to treat the waste to obtain potable water that can be jettisoned from the aircraft to reduce the weight of the aircraft, resulting in an increased fuel efficiency for the aircraft. The illustrative examples also recognize and take into account that it would be desirable to increase an amount of time between servicing of waste tanks using lavatory trucks.

The illustrative examples also recognize and take into account that currently used waste tanks can be greater in size or volume than desired. As a result, the amount of space present for other use in a vehicle may be reduced.

The illustrative examples also recognize and take into account that many of these considerations are valid for other types of vehicles in addition to aircraft in which those vehicles have lavatories with waste tanks. Thus, the illustrative examples provide a method, an apparatus, and a system for treating waste in a vehicle. In one illustrative example, the waste is received from a lavatory in a waste tank through a waste input port connected to a lavatory in the vehicle. Anaerobic bacteria are introduced into the waste such that anaerobic digestion occurs to breakdown a biodegradable material in the waste in the waste tank.

Figure 1:
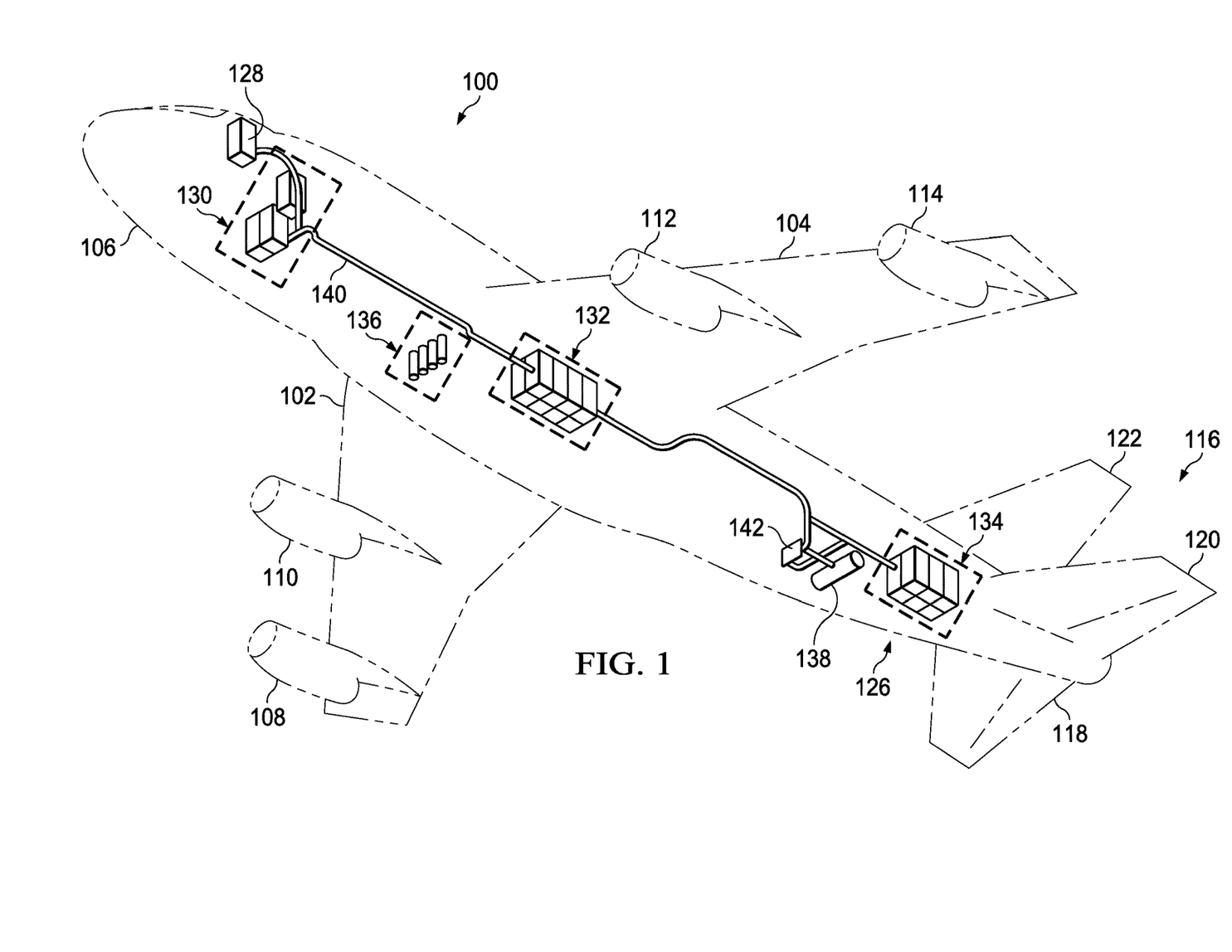
FIG. 1 is an illustration of an aircraft in accordance with an illustrative example.

With reference now to the figures and, in particular, with reference to FIG. 1, an illustration of an aircraft is depicted in accordance with an illustrative example. In this illustrative example, aircraft 100 has wing 102 and wing 104 attached to body 106. Aircraft 100 includes engine 108 and engine 110 connect to wing 102. Engine 112 and engine 114 are connected to wing 104.

Body 106 also has tail section 116. Horizontal stabilizer 118, horizontal stabilizer 120, and vertical stabilizer 122 are connected to tail section 116 of body 106.

In this illustrative example, aircraft 100 is a commercial passenger aircraft that includes lavatory system 126. As depicted, lavatory system 126 includes lavatory 128, forward lavatories 130, mid lavatories 132, aft lavatories 134, water tanks 136, and waste tank 138. These different components are connected to each other by conduit system 140.

Conduit system 140 comprises pipes or other tubes that are designed to carry water from water tanks 136 or carry waste from the lavatories to waste tank 138. As depicted, water tanks 136 supply water for use in the different lavatories as well as other locations in the aircraft such as a galley. Waste tank 138 receives waste from the different lavatories. Waste tank 138 can be serviced via waste service panel 142. For example, a lavatory truck can connect to waste tank 138 through waste service panel 142 to service waste tank 138.

Aircraft 100 is one example of a vehicle in which a vehicle waste treatment system can be implemented within lavatory system 126. The vehicle waste treatment system can be implemented in various components within lavatory system 126. For example, elements of the waste treatment system can be implemented within at least one of waste tank 138, conduit system 140, lavatory 128, forward lavatories 130, mid lavatories 132, or aft lavatories 134.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
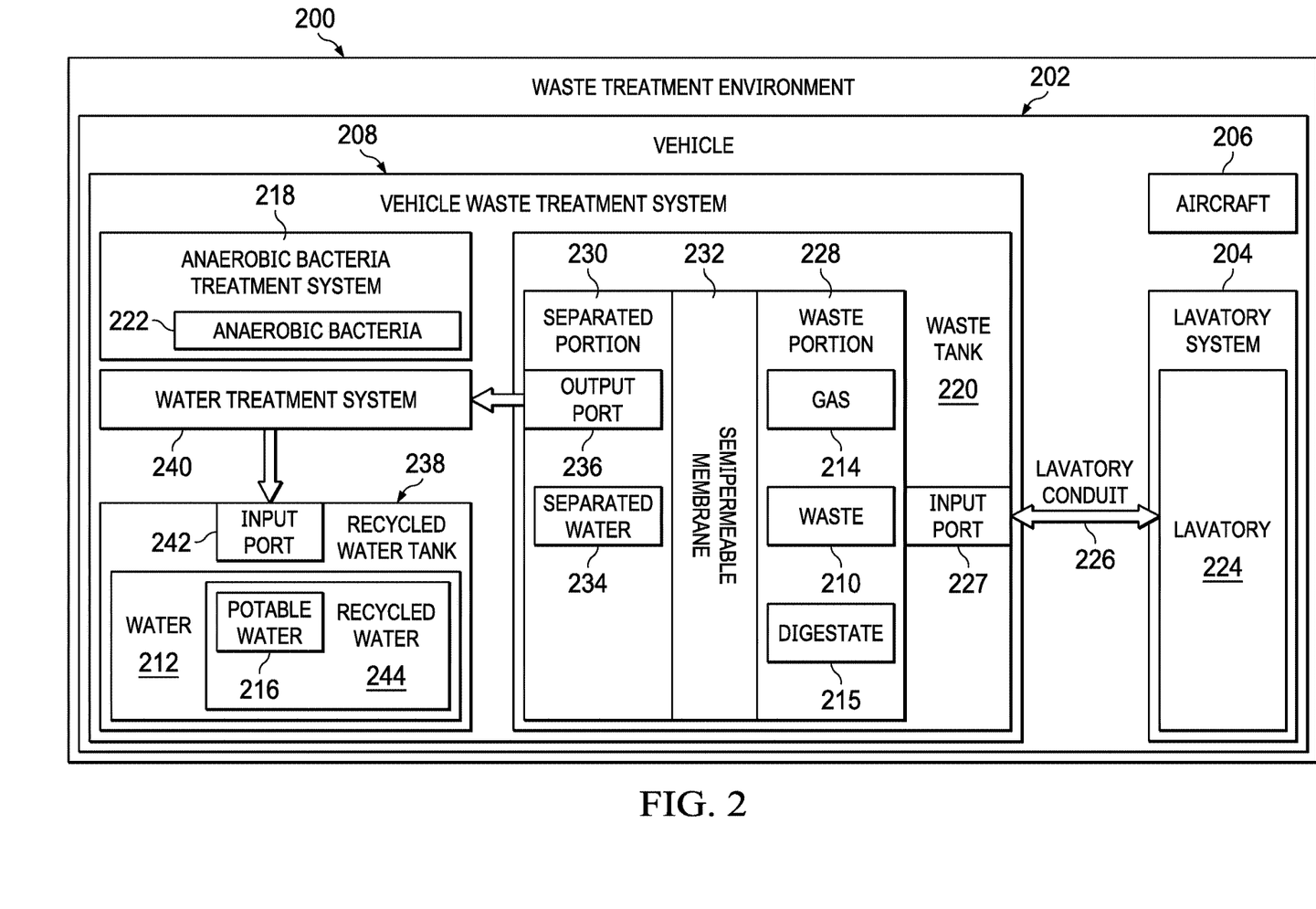
FIG. 2 is an illustration of a block diagram of a waste treatment environment in accordance with an illustrative example.

With reference now to FIG. 2, an illustration of a block diagram of a waste treatment environment is depicted in accordance with an illustrative example. As depicted, waste treatment environment 200 is an environment in which vehicle 202 includes lavatory system 204. In one illustrative example, vehicle 202 takes the form of aircraft 206. Aircraft 100 in FIG. 1 is an example of one implementation for aircraft 206 shown in block form in this figure.

As depicted, vehicle waste treatment system 208 is present in vehicle 202. Vehicle waste treatment system 208 operates to treat waste 210 received from lavatory system 204 in vehicle 202. In this illustrative example, vehicle waste treatment system 208 can treat waste 210 to generate water 212, gas 214, and digestate 215. Water 212 and gas 214 can be jettisoned from vehicle 202.

Digestate 215 is digested waste that remains after digestion of waste 210. As depicted, digestate 215 can be removed using conventional servicing.

In some illustrative examples, water 212 can be potable water 216, which can be reused in lavatory system 204. Potable water 216 is water 212 that is fit or suitable for drinking.

In the illustrative example, vehicle waste treatment system 208 comprises anaerobic bacteria treatment system 218. In some illustrative examples, vehicle waste treatment system 208 can also include waste tank 220 in which waste tank 220 can include at least one of modifications or components for anaerobic bacteria treatment system 218.

As depicted, anaerobic bacteria treatment system 218 contains anaerobic bacteria 222 selected to digest waste 210 in waste tank 220. In this illustrative example, anaerobic bacteria treatment system 218 introduces anaerobic bacteria 222 to waste 210 such that anaerobic digestion occurs to breakdown biodegradable material in waste 210 in waste tank 220.

Anaerobic bacteria 222 can take any number of forms. For example, anaerobic bacteria 222 can be suspended in a liquid, located in a biodegradable water-soluble polymer, or in some other inoculum or suitable material.

As depicted, anaerobic bacteria 222 can be selected from any type of bacteria that is capable of digesting waste 210 in vehicle 202. Anaerobic bacteria 222 can be selected from at least one of a hydrolytic bacteria, an acidogenic bacteria, an acetogenic bacteria, a methanogenic bacteria, or some other suitable type of anaerobic bacteria.

In this example, hydrolytic bacteria can be selected from at least one of *Bacillus, Cellulomonas, Eubacterium*, or other suitable types of hydrolytic bacteria. Acidogenic bacteria can be selected from at least one of *Syntrophobacter wolinii, Syntrophomonas wolfei, Clostridium* spp., *Peptococcus anerobius, Lactobacillus*, or other suitable types of acidogenic bacteria. In this illustrative example, acetogenic bacteria can be selected from at least one of *Clostridium aceticum, Moorella thermoacetica*, or other suitable types of acetogenic bacteria. In this illustrative example, methanogenic bacteria can be selected from at least one of *Methanobacterium, Methanobacillus, Methanococcus, Methanosarcina*, or other types of methanogenic bacteria.

The particular type of anaerobic bacteria 222 selected can also depend on the environmental conditions that vehicle waste treatment system 208 is subjected to during operation of vehicle 202. For example, when vehicle 202 takes the form of aircraft 206, pressure and temperature can be factors considered in selecting the type of anaerobic bacteria 222. Anaerobic bacteria 222 selected for use in aircraft 206 can be required to digest waste 210 in temperatures such as −60 degrees F. The pressure conditions can be, for example, 7.34 pounds per square inch or 3.62 pounds per square inch. These and other factors can be used in selecting the type of anaerobic bacteria 222. For example, the selection of anaerobic bacteria can be based on at least one of the expected pH value of waste, operating temperature, loading rate, amount of time waste will reside with anaerobic bacteria, or other suitable factors.

The introduction of anaerobic bacteria 222 by anaerobic bacteria treatment system 218 can occur in a number of different locations including waste tank 220 or other locations within lavatory system 204.

In this illustrative example, waste tank 220 in vehicle 202 is connected to lavatory 224 in vehicle 202 by lavatory conduit 226. For example, waste tank 220 can have input port 227 connected to lavatory 224 by lavatory conduit 226. Further, lavatory conduit 226 can be one conduit in conduit system that leads from lavatory 224 to waste tank 220. In other words, lavatory conduit 226 can considered one piece of tubing or pipe in multiple pieces that are connected to each other from lavatory 224 to waste tank 220.

As depicted, waste tank 220 has a different configuration from currently used waste tanks in vehicles. In the illustrative example, waste tank 220 has waste portion 228 and separated portion 230. This division of waste tank 220 is a modification of an existing waste tank to have waste portion 228 and separated portion 230. In other illustrative examples, a new waste tank can be utilized that includes structures defining these portions.

In this illustrative example, semipermeable membrane 232 divides waste tank 220 into waste portion 228 and separated portion 230. Water 212 diffuses through semipermeable membrane 232 from waste 210 in waste portion 228 into separated portion 230 to form separated water 234.

Semipermeable membrane 232 can be at least one of a biological membrane, a synthetic membrane, or a polymeric membrane that allows selected molecules or ions to pass through the membrane by diffusion. In this illustrative example, semipermeable membrane 232 can be implemented using the same types of membranes used in reverse osmosis systems for treating water. Semipermeable membrane 232 can be implemented using multiple layers of the membranes or structures used for reverse osmosis.

Output port 236 is present in separated portion 230 of waste tank 220. In this illustrative example, separated water 234 can be removed from separated portion 230 through output port 236.

As depicted, vehicle waste treatment system 208 can also include a number of additional components. As depicted, vehicle waste treatment system 208 can include recycled water tank 238 and water treatment system 240.

In this example, recycled water tank 238 receives recycled water 244 from water treatment system 240. Recycled water tank 238 can store recycled water 244 for use in vehicle 202 or jettisoning from vehicle 202.

In this illustrative example, water treatment system 240 is connected to output port 236 in separated portion 230 of waste tank 220 and connected to input port 242 of recycled water tank 238. Water treatment system 240 operates to increase a water quality of separated water 234 to form recycled water 244. Water treatment system 240 can use currently available components to treat separated water 234. For example, water treatment system 240 can comprise at least one of a reverse osmosis unit, a group of water filters, an ultraviolet light system, or other suitable water treatment components.

As used herein, "a group of," when used with reference to items, means one or more items. For example, "a group of water filters" is one or more water filters.

In the illustrative example, recycled water 244 can be used as potable water 216 and can be used in lavatory 224. Recycled water 244 can be jettisoned from vehicle 202 during an operation of vehicle 202 in addition to or in place of using recycled water 244 as potable water 216 or using recycled water 244 in lavatory 224.

Figure 3:
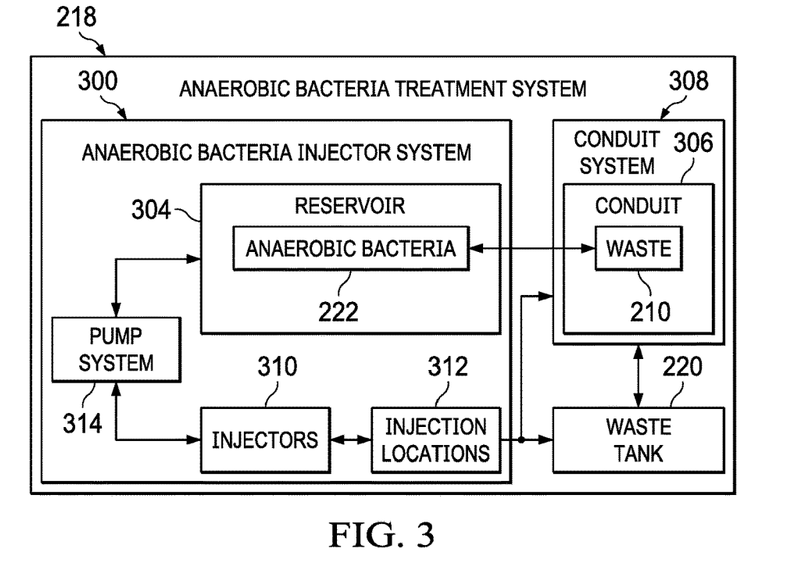
FIG. 3 is an illustration of a block diagram of components in an anaerobic bacteria treatment system in accordance with an illustrative example.

With reference now to FIG. 3, an illustration of a block diagram of components in an anaerobic bacteria treatment system is depicted in accordance with an illustrative example. In this example, anaerobic bacteria treatment system 218 comprises anaerobic bacteria injector system 300.

As depicted, anaerobic bacteria injector system 300 can introduce anaerobic bacteria 222 from reservoir 304 connected to conduit 306 in conduit system 308 leading from lavatory 224 to waste tank 220. In this illustrative example, a movement of waste 210 from lavatory 224 to waste tank 220 through conduit 306 causes anaerobic bacteria 222 stored in reservoir 304 to be moved from reservoir 304 into waste 210. In this example, reservoir 304 can be a group of tanks located in vehicle 202 in FIG. 2 that holds anaerobic bacteria 222 for use in treating waste 210.

As another example, anaerobic bacteria injector system 300 can introduce anaerobic bacteria 222 from reservoir 304 onto or into waste 210 using a group of injectors 310 positioned at a group of injection locations 312 located in at least one of conduit system 308 that carries waste 210 in anaerobic bacteria treatment system 218 in FIG. 2 or waste tank 220. In this illustrative example, an injector is a physical device that causes anaerobic bacteria 222 to be introduced into waste 210. Introduction can be through injecting anaerobic bacteria 222 onto or into waste 210. An injector in the group of injectors 310 can be selected as an injector that can inject a desired amount of anaerobic bacteria into the system. The injector in the group of injectors 310 is or can comprise a nozzle, a sprinkler, a spray nozzle, a sprayer, a plain-orifice spray nozzle, a simplex injector, a duplex dual orifice nozzle, a fan spray nozzle, or other suitable type of injector.

In this depicted example, pump system 314 moves a preselected amount of anaerobic bacteria 222 from reservoir 304 through the group of injectors 310 such that the preselected amount of anaerobic bacteria 222 is introduced onto or into waste 210. The introduction of anaerobic bacteria 222 onto or into waste 210 can be referred to as "associating" anaerobic bacteria 222 with waste 210.

Pump system 314 comprises one or more pumps. In the illustrative example, these pumps are low pressure pumps. For example, a low pressure pump can be a pump that operates at a pressure of 36 pounds per square inch (PSI) or less. Alternatively, the pressure can be measured as atmosphere pressure in which 2.45 atmospheres is 36 pounds per square inch.

As depicted in this illustrative example, the selected amount of anaerobic bacteria 222 is an amount that is sufficient to digest waste 210 that is moved into waste tank 220. For example, the selected amount of anaerobic bacteria 222 can result in a desired concentration. For example, the concentration can be such that anaerobic bacteria 222 have a concentration of one gram per liter or greater in waste 210.

Figure 4:
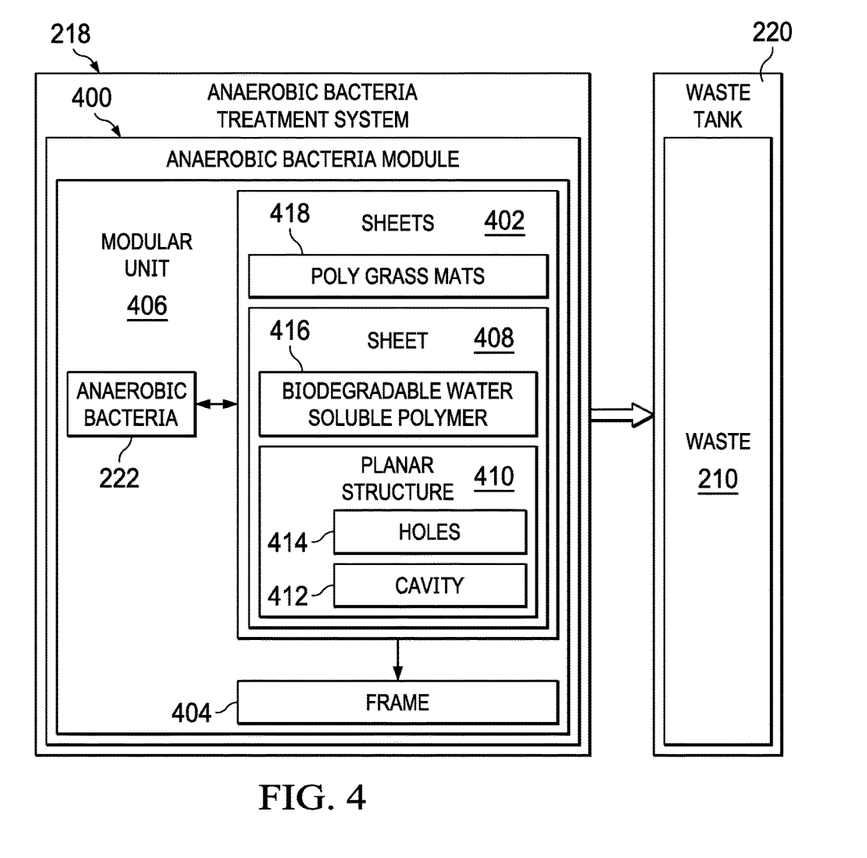
FIG. 4 is another illustration of a block diagram of components in an anaerobic bacteria treatment system in accordance with an illustrative example.

With reference next to FIG. 4, another illustration of a block diagram of components in an anaerobic bacteria treatment system is depicted in accordance with an illustrative example.

As depicted, anaerobic bacteria module 400 comprises sheets 402 located in waste tank 220 in which anaerobic bacteria 222 are associated with sheets 402. In this illustrative example, anaerobic bacteria 222 can be associated with sheets 402 by coating sheets 402, being located within sheets 402, or some combination thereof. In this illustrative example, sheets 402 are parallel to each other with a separation space between each of sheets 402.

Further, frame 404 can be in waste tank 220 and sheets 402 can be attached to frame 404. In this illustrative example, frame 404 is removably connected to the interior of waste tank 220. With frame 404, sheets 402 can be placed into and removed from waste tank 220 as a group rather than individually. As depicted, frame 404 with sheets 402 form modular unit 406.

In this illustrative example, sheet 408 in sheets 402 comprises planar structure 410 with cavity 412 in which anaerobic bacteria 222 are located. Sheet 408 also has holes 414 in planar structure 410 through which anaerobic bacteria 222 can contact waste 210 that enters waste portion 228 of waste tank 220 in FIG. 2. These holes can be located on a wall or on multiple walls on planar structure 410.

Further, sheet 408 can include biodegradable water-soluble polymer 416 within cavity 412. Anaerobic bacteria 222 can be contained in biodegradable water-soluble polymer 416. When biodegradable water-soluble polymer 416 is present, biodegradable water-soluble polymer degrades and releases anaerobic bacteria 222 when biodegradable water-soluble polymer 416 comes into contact with waste 210 through holes 414. In some illustrative examples, sheets 402 can take the form of poly grass mats 418.

Thus, one or more illustrative examples provide an ability to overcome a technical problem with at least one of fuel efficiency of an aircraft or the availability of an aircraft. Further, the illustrative examples also provide an ability to overcome a technical problem with waste tanks using more space than desired in a vehicle.

The illustrative examples provide one or more technical solutions that enable reducing the weight of a vehicle and reducing the amount of service needed for the vehicle. The illustrative examples provide one or more technical solutions in which the reduction in weight can increase fuel efficiency for the vehicle. Further, the illustrative examples provide one or more technical solutions that may reduce the maintenance needed for a vehicle. As result, these technical solutions may enable increasing the availability of the vehicle. Further, the illustrative examples also provide one or more technical solutions that enable reducing the size of waste tanks by implementing an anaerobic bacteria treatment system in the vehicle to digest waste in a waste tank.

The illustrations of waste treatment environment 200 and the different components in FIGS. 2-4 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, vehicle 202 can take other forms in addition to or in place of aircraft 206. For example, vehicle 202 is or can comprise an aircraft 206, a commercial aircraft, a rotorcraft, a bus, a surface ship, a personnel carrier, a train, a sub-surface ship, a submarine, a spacecraft, and other suitable types of vehicles. These examples are illustrations of some forms of vehicles that vehicle 202 can take. Vehicle 202 can be any vehicle in which a lavatory system can be implemented.

As another example, although water treatment system 240 is shown as outside of waste tank 220, one or more of the components in water treatment system 240 can be located inside of waste tank 220. For example, at least one of a reverse osmosis unit, a group of water filters, or an ultraviolet light system can be located inside of waste tank 220. For example, some of these components can be located within separated portion 230 or located in a third portion within waste tank 220.

In yet another illustrative example, the function of pump system 314 can be implemented using existing mechanisms in vehicle 202 rather than adding a new pump to vehicle 202. For example, when vehicle 202 takes the form of aircraft 206, lavatory 224 can have a vacuum pump for a vacuum flush. The injection point for introducing anaerobic bacteria 222 within conduit system 308 can be selected to take advantage of the vacuum generated by the backing pump. This vacuum can be used to cause anaerobic bacteria 222 to be moved from reservoir 304 and introduced into waste 210 in conduit 306.

Figure 5:
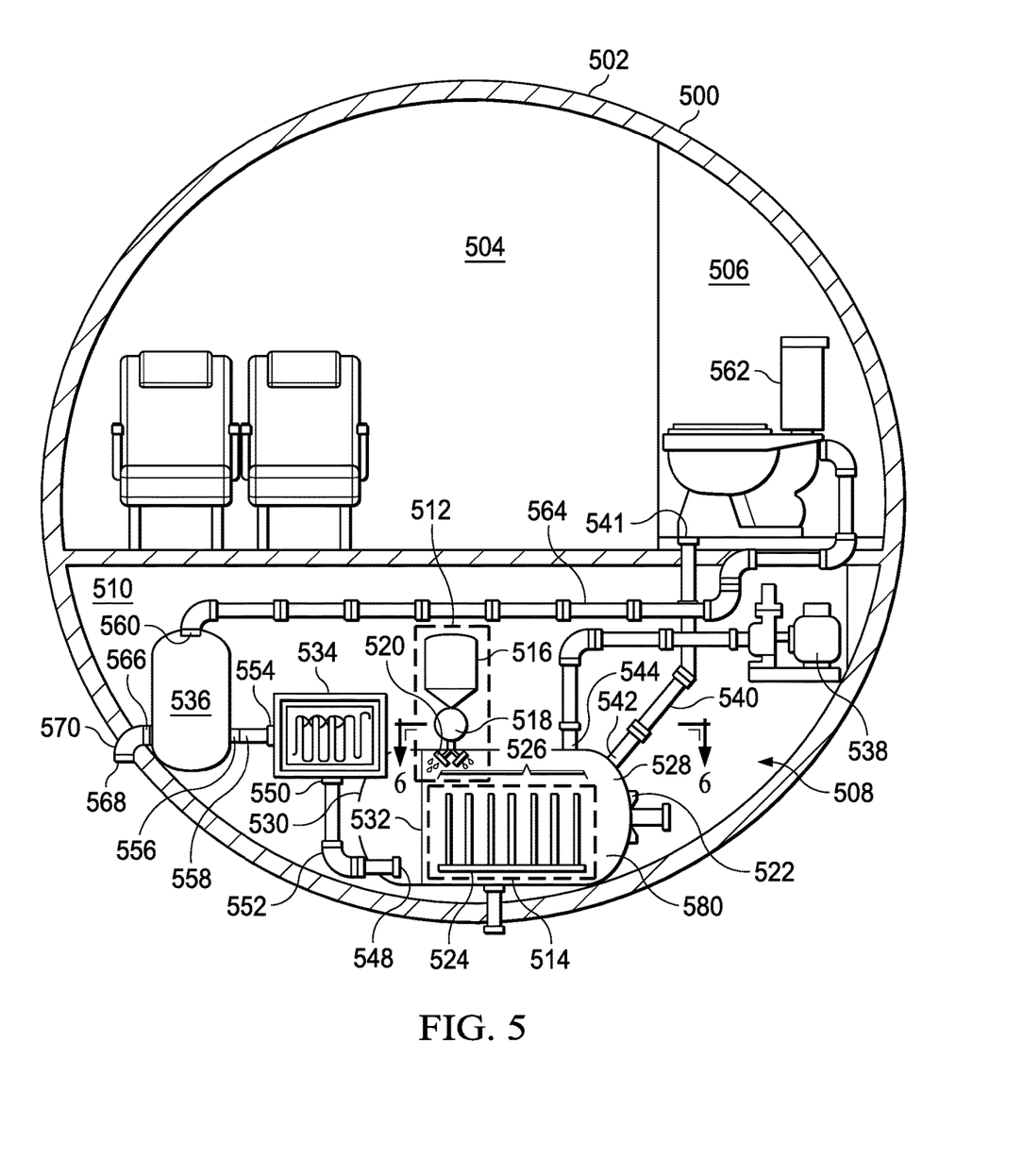
FIG. 5 is a pictorial illustration of an anaerobic bacteria treatment system in an aircraft in accordance with an illustrative example.

With reference to FIG. 5, a pictorial illustration of an anaerobic bacteria treatment system in an aircraft is depicted in accordance with an illustrative example. In this illustrative example, a cross-sectional view of fuselage 500 of aircraft 502 is shown. Aircraft 502 is an example of one implementation for aircraft 206 shown in block form in FIG. 2.

In this view, passenger cabin 504 and lavatory 506 are depicted. Also shown is waste treatment system 508 in lower section 510 under passenger cabin 504. In this illustrative example, anaerobic bacteria injector system 512 and anaerobic bacteria module 514 are part of an anaerobic bacteria treatment system. Anaerobic bacteria injector system 512 is an example of one implementation of anaerobic bacteria injector system 300 shown in block form in FIG. 3. Anaerobic bacteria module 514 is an example of one implementation of anaerobic bacteria module 400 shown in block form in FIG. 4.

As depicted, anaerobic bacteria injector system 512 includes reservoir 516, pump 518, and injectors 520. In this example, injectors 520 are located inside of waste tank 522.

Anaerobic bacteria module 514 is located inside of waste tank 522. In this example, anaerobic bacteria module 514 comprises frame 524 and sheets 526 that are connected to frame 524. In this example, frame 524 is a plate. Frame 524 can be comprised of at least one of a metal, an aluminum, a polymer, a polycarbonate, a carbon fiber-reinforced polymer, or some other suitable material.

Waste tank 522 is an example of one implementation for waste tank 220 shown in block form in FIG. 2. As depicted, injectors 520 and anaerobic bacteria module 514 are located within waste portion 528 of waste tank 522. In this illustrative example, waste tank 522 also includes separated portion 530. Semipermeable membrane 532 divides waste tank 522 into waste portion 528 and separated portion 530.

As depicted, waste treatment system 508 can also include water treatment system 534. Water treatment system 534 can include at least one of a reverse osmosis unit, a group of filters, an ultraviolet light unit, or other suitable components for increasing the quality of water. The treated water can be stored in recycled water tank 536.

During operation, waste can be moved from lavatory 506 into waste portion 528 in waste tank 522. This movement of waste can be performed using vacuum pump 538. Vacuum pump 538 can provide for a vacuum flush of waste from lavatory 506 into waste tank 522 through conduit 540. In this example, conduit 540 is connected to lavatory output port 541 and waste input port 542. As depicted, vacuum pump 538 draws a vacuum through vacuum port 544 in waste tank 522.

As depicted, anaerobic bacteria are stored in reservoir 516. The anaerobic bacteria can be injected into waste located in waste portion 528 of waste tank 522. As depicted, this injection of the anaerobic bacteria can be performed using pump 518 to move the anaerobic bacteria from reservoir 516 into waste tank 522. Pump 518 can be configured, programmed, or set to move a selected amount of anaerobic bacteria from reservoir 516 into waste tank 522. For example, vacuum suction can move the waste from the lavatory along with anaerobic bacteria.

In this illustrative example, the anaerobic bacteria enter separated portion 530 in waste tank 522 through injectors 520. In this illustrative example, injectors 520 take the form of spray nozzles.

As depicted, sheets 526 are arranged parallel to each other with a separation distance. In this illustrative example, the separation distance is the same between each of sheets 526. In other illustrative examples, separation distance can change. The separation distance can be selected based on a number of different factors. For example, separation distance can be selected based on the number of sheets 526 used in waste tank 522. In this example, the number of sheets 526 is a function of quantity of anaerobic bacteria that should be in waste tank 522. The separation distance between different sheets in sheets 526 can change in order to take into account the distribution of waste in waste tank 522. The positioning of sheets 526 on frame 524 in waste portion 528 of waste tank 522 is such that waste comes into contact with one or more of sheets 526.

In this illustrative example, the anaerobic bacteria are associated with sheets 526. In being associated with sheets 526, the anaerobic bacteria can coat sheets 526, be located within sheets 526, or some combination thereof. When located within sheets 526, sheets 526 are permeable such that the anaerobic bacteria can contact the waste entering waste tank 522.

Further, anaerobic bacteria module 514 is removably connected to waste tank 522. As depicted in this example, door 580 is present in waste portion 528 in waste tank 522. Door 580 can be opened to enable removing anaerobic bacteria module 514 and replacing this removed module with a new or fresh anaerobic bacteria module.

When waste is digested with the anaerobic bacteria in waste portion 528 of waste tank 522. Water is generated as part of the process of anaerobic bacteria digesting waste in waste tank 522. The water can be moved by diffusion through semipermeable membrane 532 into separated portion 530 of waste tank 522 to form separated water.

The separated water moves out of waste tank 522 through output 548 in waste tank 522 and into water treatment system 534 through input 550 in water treatment system 534 using conduit 552. The separated water treated by water treatment system 534 can move through output 554 in water treatment system 534 and into input port 556 of recycled water tank 536 using conduit 558. Water treatment system 534 operates to treat the separated water to form recycled water that is stored in recycled water tank 536. This recycled water can be potable water.

In this illustrative example, the recycled water can be reused in lavatory 506. The recycled water can be from output 560 in recycled water tank 536 to input 562 of lavatory 506 through conduit 564.

Alternatively, the recycled water can be jettisoned from aircraft 502. In this example, the recycled water can be moved through output 566 in recycled water tank 536 to output 568 of fuselage 500 through conduit 570 such that the recycled water is jettisoned from aircraft 502.

Figure 6:
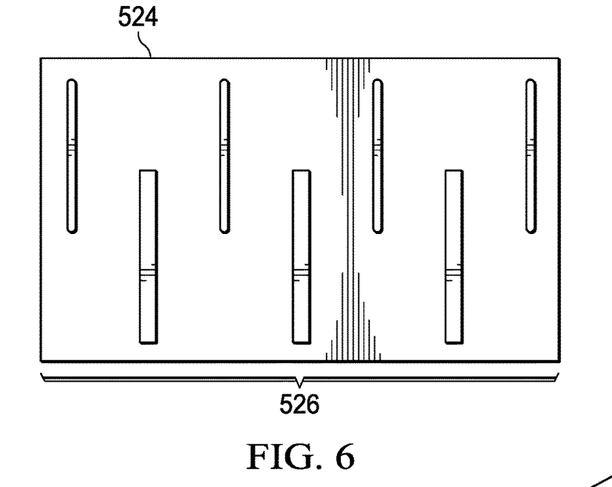
FIG. 6 is an illustration of a top view of sheets installed in a waste tank in accordance with an illustrative example.

With reference next to FIG. 6, an illustration of a top view of sheets installed in a waste tank is depicted in accordance with an illustrative example. In this depicted example, a top view of sheets 526 can be sees in the direction of lines 6-6 in FIG. 5. In this view, sheets 526 are shown as parallel to each other. Additionally, sheets 526 are shown as staggered with respect to each other as well as being parallel.

Figure 7:
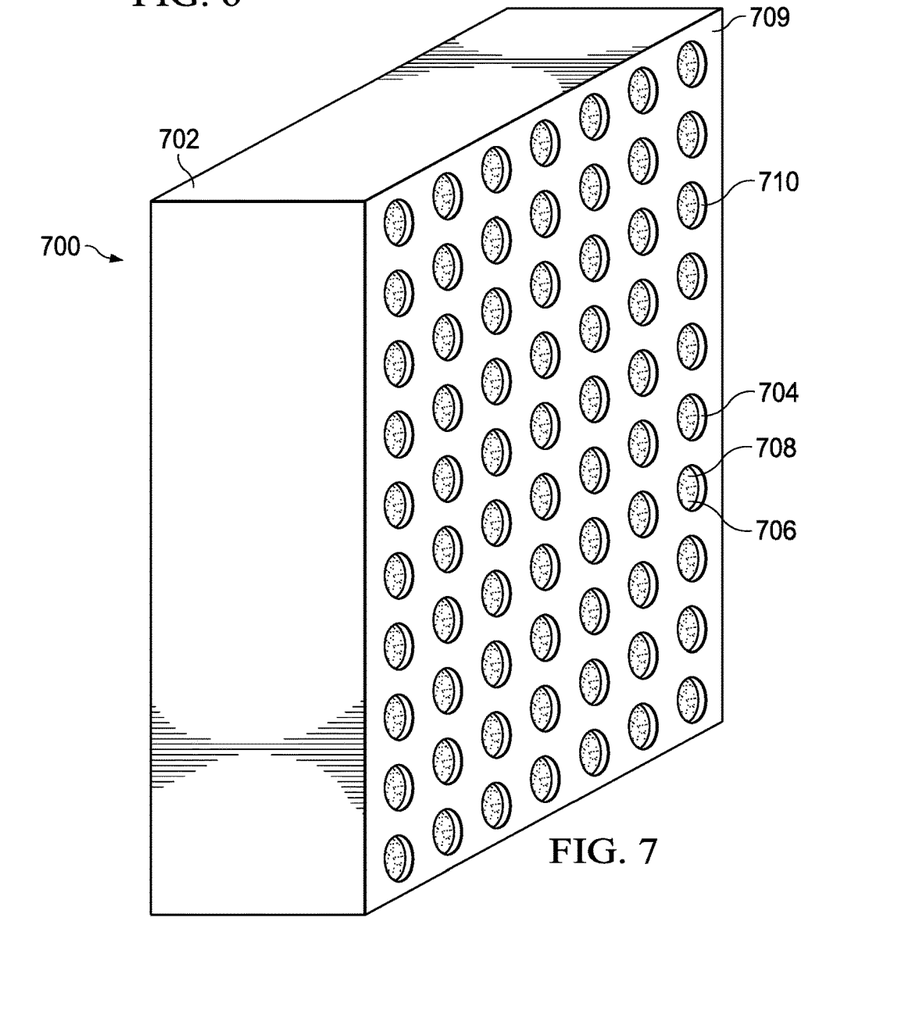
FIG. 7 is an illustration of a sheet in an anaerobic bacteria module in accordance with an illustrative example.

With reference next to FIG. 7, an illustration of a sheet in an anaerobic bacteria module is depicted in accordance with an illustrative example. As depicted, sheet 700 is an example of one implementation for a sheet in sheets 402 shown in block form in FIG. 4. In this illustrative example, sheet 700 comprises planar structure 702 with cavity 704. Anaerobic bacteria 706 is present in cavity 704. In this example, anaerobic bacteria 706 can be held in biodegradable water-soluble polymer 708 within cavity 704. In this illustrative example, biodegradable water-soluble polymer 708 degrades through exposure to waste. In particular, the degradation occurs in response to biodegradable water-soluble polymer 708 contacting water in the waste. The degradation can be such that anaerobic bacteria 706 is released in amounts sufficient to process the waste.

In this example, wall 709 includes holes 710. Holes 710 enable waste to contact anaerobic bacteria 706 that has been released from biodegradable water-soluble polymer 708 holding anaerobic bacteria 706 within cavity 704. Waste may enter holes 710 or anaerobic bacteria 706 can exit cavity 704 through holes 710.

The illustrations of waste treatment system 508 and the different components in FIGS. 5-7 are provided as an example of one manner in which sheet 700 in vehicle waste treatment system 208 shown in block form in FIG. 2 can be implemented. These illustrations are not meant to limit the manner in which other illustrative examples can be implemented.

For example, waste treatment system 508 can omit either anaerobic bacteria injector system 512 or anaerobic bacteria module 514. In other examples, sheets 526 can be connected directly to waste tank 522 instead of being connected to frame 524. In another example, injectors 520 in anaerobic bacteria injector system 512 can be in other locations in addition to or in place of within waste portion 528 of waste tank 522. For example, injectors 520 can be located in one or more locations along conduit 540.

As another example, wall 709 in sheet 700 can be comprised of a porous material that allows anaerobic bacteria to pass through or diffuse through wall 709 instead of using holes 710. As another example, one or more walls in planar structure 702 in addition or in place of wall 709 can include holes 710. In yet another example, sheet 700 can be curved, have a wave shape, or some other shape in place of a planar shape.

In FIG. 5, frame 524 and sheets 526 are shown as being connected to the bottom of waste tank 522. Frame 524 and sheets 526 can be connected to the sides of waste tank 522 or other suitable locations.

Figure 8:
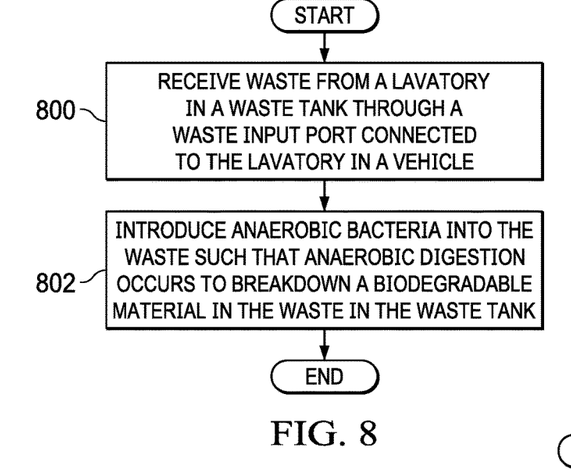
FIG. 8 is an illustration of a flowchart of a process for treating waste in a vehicle in accordance with an illustrative example.

Turning next to FIG. 8, an illustration of a flowchart of a process for treating waste in a vehicle is depicted in accordance with an illustrative example. The process in FIG. 8 can be implemented in vehicle waste treatment system 208 in FIG. 2.

The process begins by receiving waste from a lavatory in a waste tank through a waste input port connected to the lavatory in a vehicle (operation 800). The process introduces anaerobic bacteria into the waste such that anaerobic digestion occurs to breakdown a biodegradable material in the waste in the waste tank (operation 802). The process terminates thereafter.

Figure 9:
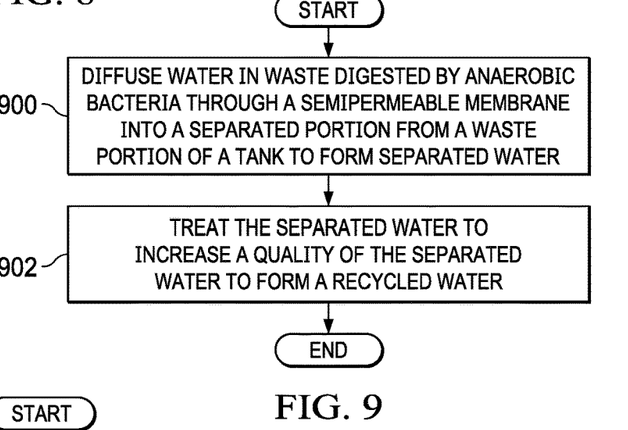
FIG. 9 is an illustration of a flowchart of a process for processing waste treatment system in accordance with an illustrative example.

With reference to FIG. 9, an illustration of a flowchart of a process for processing waste digested by anaerobic bacteria is depicted in accordance with an illustrative example. The process in FIG. 9 can be implemented in vehicle waste treatment system 208 in FIG. 2.

The process diffuses water in waste digested by anaerobic bacteria through a semipermeable membrane into a separated portion from a waste portion of a tank to form separated water (operation 900). The process treats the separated water to increase a quality of the separated water to form a recycled water (operation 902). The process terminates thereafter.

In operation 902, the separated water can be treated by at least one of reverse osmosis, filtering, or exposure to ultraviolet light. The recycled water can be used in the lavatory. Further, the recycled water can be jettisoned from the vehicle during an operation of the vehicle. For example, the recycled water can be jettisoned during flight of an aircraft.

Further, the recycled water can have a sufficient water quality to form potable water. The recycled water can be sent to a potable water system for use as potable water.

Figure 10:
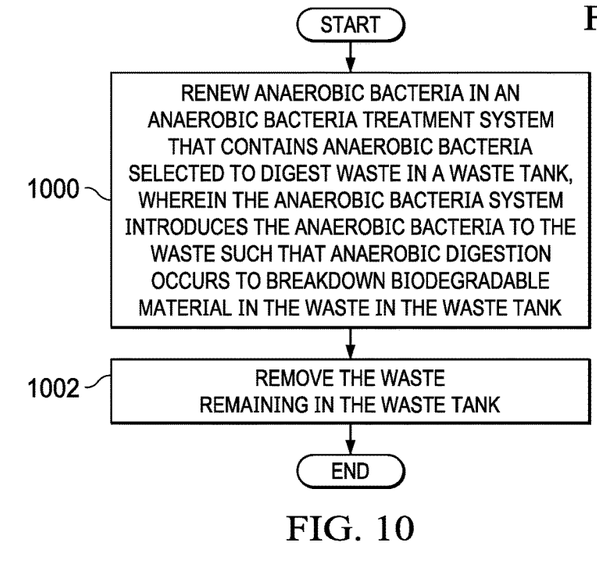
FIG. 10 is an illustration of a flowchart of a process for servicing an anaerobic bacteria treatment system in a waste treatment system in a vehicle in accordance with an illustrative example.

Turning to FIG. 10, an illustration of a flowchart of a process for servicing an anaerobic bacteria treatment system in a waste treatment system in a vehicle is depicted in accordance with an illustrative example. The process in FIG. 10 can be implemented to service vehicle waste treatment system 208 in FIG. 2.

The process begins by renewing anaerobic bacteria in an anaerobic bacteria treatment system that contains anaerobic bacteria selected to digest waste in a waste tank, wherein the anaerobic bacteria system introduces the anaerobic bacteria to the waste such that anaerobic digestion occurs to breakdown biodegradable material in the waste in the waste tank (operation 1000).

The process then removes the waste remaining in the waste tank (operation 1002). The process terminates thereafter.

Figure 11:
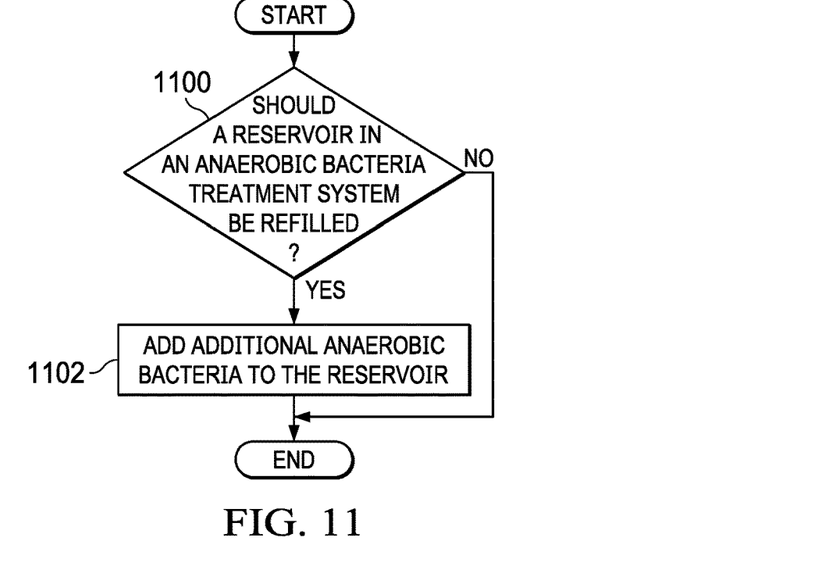
FIG. 11 is an illustration of a flowchart of a process for servicing an anaerobic bacteria treatment system in a waste treatment system in a vehicle in accordance with an illustrative example.

With reference to FIG. 11, an illustration of a flowchart of a process for servicing an anaerobic bacteria treatment system in a waste treatment system in a vehicle is depicted in accordance with an illustrative example. The process in FIG. 11 is an example of one manner in which operation 1000 in FIG. 10 can be implemented.

The process begins by determining whether a reservoir in an anaerobic bacteria treatment system should be refilled (operation 1100). The determination in operation 1100 can be performed in a number of different ways. For example, the determination can be made by a human operator inspecting the reservoir. In another illustrative example, a sensor can be used to detect the amount of anaerobic bacteria in the reservoir.

If the reservoir should be refilled, the process adds additional anaerobic bacteria to the reservoir (operation 1102). The process terminates thereafter. With reference again to operation 1100, if the reservoir should not be refilled, the process also terminates.

Figure 12:
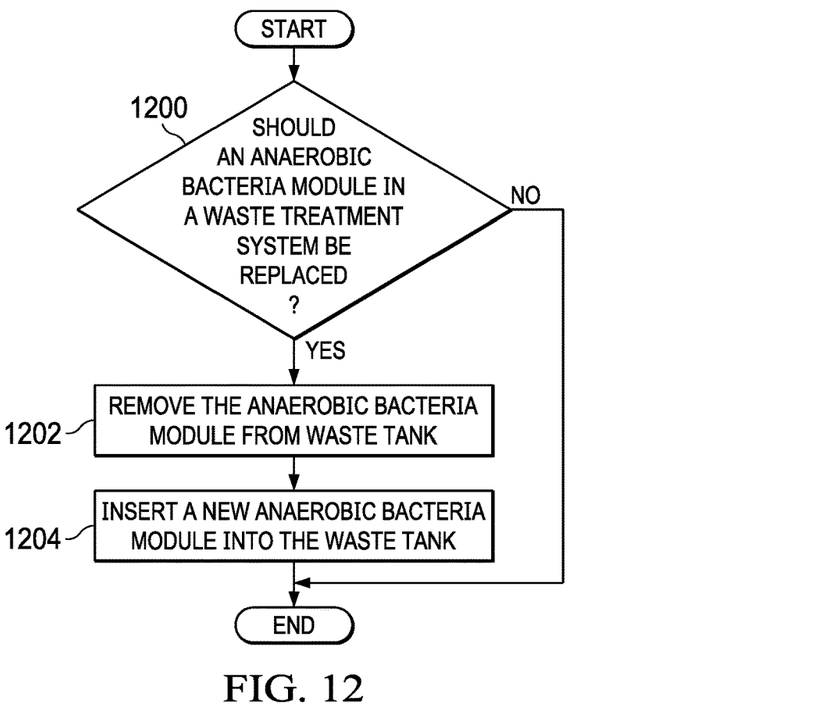
FIG. 12 is an illustration of a flowchart of a process for servicing an anaerobic bacteria treatment system in a waste treatment system in a vehicle in accordance with an illustrative example.

With reference to FIG. 12, an illustration of a flowchart of a process for servicing an anaerobic bacteria treatment system in a waste treatment system in a vehicle is depicted in accordance with an illustrative example. The process in FIG. 12 is an example of one manner in which operation 1000 in FIG. 10 can be implemented.

The process begins by determining whether an anaerobic bacteria module in a waste tank should be replaced (operation 1200). The determination of whether the model should be replaced can be performed in a number of different ways. For example, a module can be replaced after a selected period of time, a selected number of flights, or based on some other condition.

If the anaerobic bacteria module should be replaced, the anaerobic bacteria module is removed from the waste tank (operation 1202). The removal can be performed by opening a door or a hatch in the waste tank. The module can then be removed after the opening of the door or hatch.

The process then inserts a new anaerobic bacteria module into the waste tank (operation 1204). The process terminates thereafter. With reference again to operation 1200, if the anaerobic bacteria module should not be replaced, the process terminates.

The flowcharts and block diagrams in the different depicted examples illustrate the architecture, functionality, and operation of some possible implementations of apparatuses and methods in an illustrative example. In this regard, each block in the flowcharts or block diagrams can represent at least one of a module, a segment, a function, or a portion of an operation or step. In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
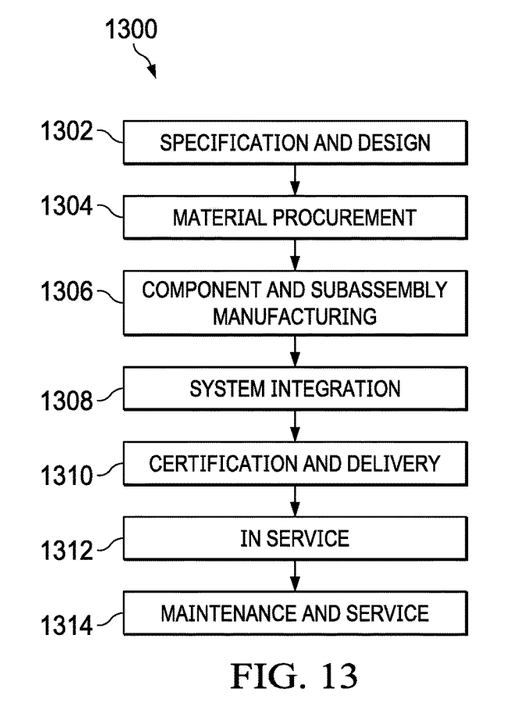
FIG. 13 is an illustration of an aircraft manufacturing and service method in accordance with an illustrative example.
Figure 14:
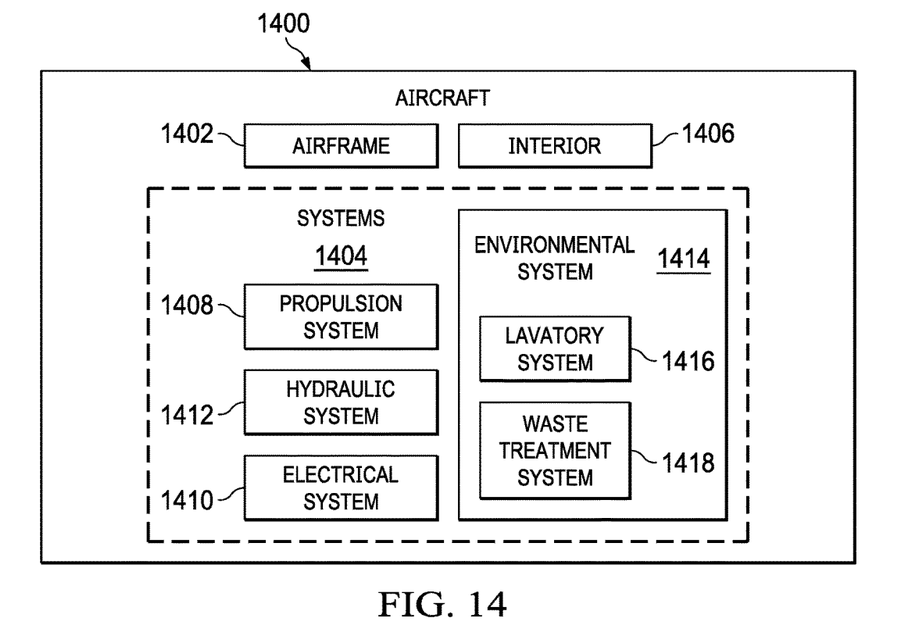
FIG. 14 is an illustration of a block diagram of an aircraft in which an illustrative example may be implemented.

Illustrative examples of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative example. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 can go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative example may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. In this illustrative example, lavatory system 1416 and waste treatment system 1418 are part of environmental system 1414. Waste treatment system 1418 can be implemented using vehicle waste treatment system 208 shown in block form in FIG. 2.

Any number of other systems may be included. Although an aerospace example is shown, different illustrative examples may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus examples, method examples, or a combination thereof can be utilized during production stages, such as component and subassembly manufacturing 1306 and system integration 1308 in FIG. 13. One or more apparatus examples, method examples, or a combination thereof may be utilized while aircraft 1400 is in service 1312, during maintenance and service 1314 in FIG. 13, or both. For example, vehicle waste treatment system 208 in FIG. 2 can be implemented in aircraft 1400 as part of routine maintenance and service 1314, which may include modification, reconfiguration, refurbishment, and other maintenance or service.

For example, waste treatment system 1418 can be implemented in aircraft 1400 during at least one of system integration 1308 and maintenance and service 1314. The use of waste treatment system 1418 implemented using vehicle waste treatment system 208 in FIG. 2 can increase fuel efficiency of aircraft 1400. For example, by jettisoning treated water, the weight of aircraft working hundred can be reduced, increasing the fuel efficiency of aircraft 1400. Further, the use of waste treatment system 1418 can also reduce the time needed for maintenance and service. In this manner, the availability of aircraft 1400 can be greater using waste treatment system 1418 as compared to currently systems for storing waste in aircraft 1400.

The use of a number of the different illustrative examples may substantially expedite the assembly of aircraft 1400, reduce the cost of aircraft 1400, or both expedite the assembly of aircraft 1400 and reduce the cost of aircraft 1400.

Thus, the illustrative examples provide a method, an apparatus, and s system for treating waste in a vehicle. The waste is received from a lavatory in a waste tank through a waste input port connected to the lavatory in the vehicle. Anaerobic bacteria are introduced into the waste such that anaerobic digestion occurs to breakdown a biodegradable material in the waste in the waste tank.

Thus, one or more illustrative examples provides an ability to reduce the amount waste in a waste tank. The digestion of waste using anaerobic bacteria generates recycled water. This recycled water can be jettisoned or used within the vehicle.

The illustrative examples provide an ability to reduce waste management concerns in which waste tanks often occupy a larger volume than desired. With the waste treatment system depicted in the illustrative examples, the size of the waste tanks can be reduced.

The description of the different illustrative examples has been presented for purposes of illustration and description and is not intended to be exhaustive or limited to the examples in the form disclosed. The different illustrative examples describe components that perform actions or operations. In an illustrative example, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A waste treatment system in an aircraft, such that the waste treatment system comprises:
   a waste tank, in the aircraft, that comprises a waste portion and a separated portion;
   an anaerobic bacteria treatment system that contains anaerobic bacteria selected to digest a waste in the waste tank and configured to introduce the anaerobic bacteria to the waste such that anaerobic digestion occurs to breakdown biodegradable material in the waste in the waste tank;
   a semipermeable membrane that extends across the waste tank, defines a separation of the waste portion from the separated portion, and is configured for water diffusion through the semipermeable membrane into the separated portion to form separated water, such that the waste portion of the waste tank connects to:

a vacuum pump; and a lavatory in the aircraft by a conduit system connected to a reservoir configured to store the anaerobic bacteria in a configuration such that, responsive to a vacuum caused by the vacuum pump, a movement of waste from the lavatory to the waste tank through the conduit system also causes a movement of anaerobic bacteria, stored in the reservoir, from the reservoir into the conduit system;

sheets within the waste portion of the waste tank configured to support the anaerobic bacteria and separated from each other by a distance that varies based upon a distribution of waste in the waste tank; and an output port in the separated portion of the waste tank configured to remove the separated water from the separated portion through the output port to a water treatment system connected to a recycled water tank connected to the lavatory and to an output configured to jettison recycled water out of the aircraft.

2. The waste treatment system of claim 1 further comprising:

the output configured to jettison the recycled water through a fuselage of the aircraft;

the recycled water tank configured to hold the recycled water; and wherein the water treatment system increases a water quality of the separated water to form the recycled water.

3. The waste treatment system of claim 2, wherein the water treatment system comprises at least one of a reverse osmosis unit, a group of water filters, or an ultraviolet light system.

4. The waste treatment system of claim 1, further comprising the sheets configured parallel to each other with a separation space between each of the sheets that varies based upon a quantity of the anaerobic bacteria required in the waste tank.

5. The waste treatment system of claim 4, wherein the anaerobic bacteria treatment system further comprises:

a frame in the waste tank, wherein the sheets are attached to the frame.

6. The waste treatment system of claim 1, wherein the anaerobic bacteria treatment system comprises:

an anaerobic bacteria injector system comprising:

a group of injectors positioned at a group of injection locations located in at least one of the conduit system that carries the waste in the aircraft or the waste tank; and the reservoir that holds the anaerobic bacteria.

7. The waste treatment system of claim 2, wherein the recycled water in the recycled water tank also distributes to a potable water.

8. The waste treatment system of claim 1, wherein the aircraft is a commercial aircraft.

9. An aircraft waste treatment system that comprises:

a lavatory and a waste tank that comprises a separated portion, connected to a recycled water tank, and a waste portion connected to a vacuum pump and configured to receive waste from the lavatory, such that the waste tank comprises a semipermeable membrane that extends across the waste tank and defines a separation of the waste portion from the separated portion;

a reservoir connected to a conduit system from the lavatory to the waste tank and configured to store an anaerobic bacteria configured to digest the waste in the waste tank, such that:

an anaerobic digestion occurs to breakdown a biodegradable material in the waste in the waste tank and generate water that becomes separated water in the separated portion of the waste tank; and the vacuum pump is configured to cause a vacuum in the waste tank that causes a movement of the waste from the lavatory to the waste tank through the conduit system and a movement of the anaerobic bacteria, stored in the reservoir, from the reservoir into the conduit system;

sheets within the waste tank configured to support the anaerobic bacteria and separated from each other by a distance that varies based upon a desired waste distribution in the waste portion of in the waste tank; and an output port in the separated portion connected to a water treatment system connected to a recycled water tank connected to the lavatory and to an output configured to jettison recycled water out of the aircraft.

10. The aircraft waste treatment system of claim 9, further comprising:

the anaerobic bacteria stored in the reservoir and moved from the reservoir into the waste comprising a coat on the sheets.

11. The aircraft waste treatment system of claim 10, further comprising:

a frame in the waste tank, wherein the sheets are attached to the frame; and the sheets being separated from each other by a distance that varies based upon a quantity of the anaerobic bacteria required in the waste tank.

12. The aircraft waste treatment system of claim 10, wherein the sheets are parallel to each other.

13. The aircraft waste treatment system of claim 11, wherein the frame is removably connected to the waste tank.

14. The aircraft waste treatment system of claim 11, wherein the sheets comprise:

poly grass mats, wherein the anaerobic bacteria are associated with the poly grass mats.

15. The aircraft waste treatment system of claim 11, wherein a sheet in the sheets comprises:

a planar structure with a cavity in which the anaerobic bacteria are located; and holes in the planar structure through which the anaerobic bacteria contact the waste.

16. The aircraft waste treatment system of claim 15, wherein each sheet further comprises:

a biodegradable water-soluble polymer in which the anaerobic bacteria are located, wherein the biodegradable water-soluble polymer degrades and releases the anaerobic bacteria when the biodegradable water-soluble polymer comes into contact with the waste.

17. The aircraft waste treatment system of claim 9, further comprising injectors positioned at a group of injection locations located in the conduit system that carries the waste in the aircraft waste treatment system or in the waste tank.

18. The aircraft waste treatment system of claim 17, wherein an injector in the injectors is selected from a nozzle and a plurality of nozzles.

19. The aircraft waste treatment system of claim 9, further comprising the separated water comprising water from the waste portion diffused through the semipermeable membrane.

20. The aircraft waste treatment system of claim 19, wherein the water treatment system increases a water quality of the separated water in the separated portion to form recycled water.

21. The aircraft waste treatment system of claim 20, wherein the water treatment system comprises at least one of a reverse osmosis unit, a group of water filters, or an ultraviolet light system.

22. The aircraft waste treatment system of claim 20, wherein the recycled water distributes to a potable water.

23. The aircraft waste treatment system of claim 9, wherein injectors introduce the anaerobic bacteria such that the anaerobic bacteria have a concentration of one gram per liter or greater.

24. The aircraft waste treatment system of claim 9, wherein the anaerobic bacteria are selected from at least one of a hydrolytic bacteria, an acidogenic bacteria, an acetogenic bacteria, or a methanogenic bacteria.

25. The aircraft waste treatment system of claim 9, wherein the anaerobic bacteria generate a gas, water, and a digestate.

26. The aircraft waste treatment system of claim 9, wherein the aircraft comprises a commercial aircraft.

27. A method for treating a waste in an aircraft, the method comprising:
  connecting a waste tank to a lavatory and a vacuum pump in the aircraft;
  separating, using a semipermeable membrane extending across the waste tank, a waste portion of the waste tank from a separated portion of the waste tank connected to a recycled water tank;
  receiving the waste into the waste portion through a waste input port connected to the lavatory in the aircraft;
  introducing anaerobic bacteria stored in a reservoir connected to the waste tank into the waste via moving the waste from the lavatory to the waste tank by vacuum through a lavatory conduit and thereby drawing anaerobic bacteria, stored in the reservoir, from the reservoir into the waste moving through the lavatory conduit;
  supporting the anaerobic bacteria on sheets within the waste tank separated from each other by a distance that varies based upon a desired waste distribution in the waste portion of in the waste tank and causing anaerobic digestion to breakdown a biodegradable material in the waste in the waste tank;
  forming separated water in the separated portion of the waste tank via diffusing water from the waste portion through the semipermeable membrane into the separated portion; and
  moving the separated water through a water treatment system and into the recycled water tank connected to the lavatory and to an output configured to jettison recycled water out of the aircraft.

28. The method of claim 27 further comprising:
  forming the recycled water via treating the separated water and increasing a quality of the separated water.

29. The method of claim 28, further comprising treating the separated water by at least one of: reverse osmosis, filtering, or exposure to ultraviolet light.

30. The method of claim 28, further comprising sending the recycled water to the lavatory.

31. The method of claim 28, further comprising jettisoning the recycled water from the aircraft while in flight.

32. The method of claim 28, further comprising sending the recycled water to a potable water system.

33. The method of claim 27, further comprising exposing the waste in the waste tank to the anaerobic bacteria associated with the sheets located in the waste tank and wherein the sheets are parallel to each other.

34. The method of claim 27, further comprising introducing the anaerobic bacteria to the waste at a group of locations in at least one of a conduit system that carries the waste to the waste tank or the waste tank.

35. The method of claim 27, wherein the anaerobic bacteria are introduced into the waste such that the anaerobic bacteria have a concentration of one gram per liter or greater.

36. The method of claim 27, wherein the anaerobic bacteria are selected from at least one of a hydrolytic bacteria, an acidogenic bacteria, an acetogenic bacteria, or a methanogenic bacteria.

37. The method of claim 27, wherein the aircraft comprises a commercial aircraft.

38. A method for servicing an anaerobic bacteria treatment system in an aircraft, the method comprising:
  connecting a waste portion of a waste tank to a lavatory and a vacuum pump;
  connecting a separated portion of the waste tank to a recycled water tank;
  separating, using a semipermeable membrane extending across the waste tank, the waste portion from the separated portion of the waste tank;
  renewing anaerobic bacteria in the anaerobic bacteria treatment system configured for:
    containing the anaerobic bacteria, selected for digesting a waste in the waste tank, in a reservoir connected to the waste portion of the waste tank;
    introducing the anaerobic bacteria to the waste via moving the waste from the lavatory to the waste tank by vacuum through a lavatory conduit and thereby drawing anaerobic bacteria, stored in the reservoir, from the reservoir into the waste moving through the lavatory conduit, such that anaerobic digestion breaks down biodegradable material in the waste in the waste tank;
    forming separated water in the separated portion of the waste tank;
    supporting the anaerobic bacteria on sheets within the waste tank, separated from each other by a distance that varies based upon a desired waste distribution in the waste portion of the waste tank;
    moving the separated water through a water treatment system and into the recycled water tank connected to the lavatory and to an outlet configured to jettison recycled water from the aircraft.

39. The method of claim 38 further comprising:
  removing the waste remaining in the waste tank.

40. The method of claim 38, wherein renewing the anaerobic bacteria in the anaerobic bacteria treatment system comprises:
  replacing the sheets in the anaerobic bacteria treatment system located within the waste tank.

41. The method of claim 38, further comprising adding additional anaerobic bacteria to the reservoir holding the anaerobic bacteria and injecting the additional anaerobic bacteria into the waste by movement of the waste through the lavatory conduit carrying the waste to the waste tank.

42. The method of claim 38, wherein the anaerobic bacteria treatment system is located in a commercial aircraft.

* * * * *